United States Patent [19]

Noguchi et al.

[11] Patent Number: 4,630,056

[45] Date of Patent: Dec. 16, 1986

[54] CONTROL SYSTEM FOR ANTENNA OF RECEIVING EQUIPMENT INSTALLED ON MOVING BODY

[75] Inventors: Takashi Noguchi; Shinzo Totani, both of Kariya, Japan

[73] Assignee: Nippondenso Co. Ltd., Kariya, Japan

[21] Appl. No.: 597,094

[22] Filed: Apr. 5, 1984

[30] Foreign Application Priority Data

Apr. 11, 1983 [JP] Japan .................................. 58-63495

[51] Int. Cl.[4] ........................ H04B 7/185; H01Q 3/00; B64C 17/06

[52] U.S. Cl. .................................... 342/357; 318/649; 342/359

[58] Field of Search ............... 343/352, 356, 357, 359, 343/422, 440, 441; 455/12, 25; 318/649

[56] References Cited

U.S. PATENT DOCUMENTS

| | | | |
|---|---|---|---|
| 4,035,805 | 7/1977 | Mobley | 318/649 |
| 4,156,241 | 5/1979 | Mobley et al. | 343/352 |
| 4,263,539 | 4/1981 | Barton | 343/359 |
| 4,358,767 | 11/1982 | Boireau | 343/352 |

OTHER PUBLICATIONS

"Antenna Engineering Handbook", edited by The Institute of Electronics and Communication Engineers of Japan (published by Kabushiki Kaisha Ohmu-sha) pp. 364 to 367.

*Primary Examiner*—Theodore M. Blum
*Assistant Examiner*—David Cain
*Attorney, Agent, or Firm*—Cushman, Darby & Cushman

[57] ABSTRACT

A control system for adjusting an antenna rotatably mounted on a vehicle to directly receive a transmitting signal from a geostationary satellite so as to apply it to a receiving equipment on the vehicle. The control system comprises a first sensor for sensing a first difference between a standard direction and a travelling direction of the vehicle, a second sensor for sensing a second difference between the travelling direction of the vehicle and a direction of the antenna, a microcomputer programmed to determine a third difference between the travelling direction of the vehicle and a direction of the satellite in accordance with the first difference on a basis of a predetermined difference between the standard direction and the direction of the satellite and to determine an adjustment angle for rotation of the antenna in accordance with the second and third differences, and an actuator for effecting for rotation of the antenna with the adjustment angle.

10 Claims, 12 Drawing Figures

CONTROL SYSTEM FOR ANTENNA OF RECEIVING EQUIPMENT INSTALLED ON MOVING BODY

BACKGROUND OF THE INVENTION

The present invention relates to a control system adapted to an antenna of receiving equipment, and more particularly to a control system for controlling an antenna mounted on a moving body such as an automotive vehicle, a ship or the like.

With remarkable developments of modern communication technology, mutual broadcast communications between broadcast stations located very far from each other on the earth are effectively relayed by synchronous or geostationary satellites located above the earth's equator in space. This means that radio or television programs broadcasted from distant localities on the earth can be seen and heard at homes, thanks to the satellite. As a result, it is desired to attain direct relay from the satellite to a radio or television receiver installed on an automotive vehicle, a ship or the like.

SUMMARY OF THE INVENTION

It is, therefore, a primary object of the present invention to provide a control system for an antenna mounted on a moving body, capable of finely adjusting a direction of the antenna to a direction of the geostationary satellite during movement of the moving body without any expensive, high precision direction sensor, thereby to ensure direct reception of a transmitting signal from the geostationary satellite by means of the antenna.

It is another object of the present invention to provide a control system, having the above-mentioned characteristics, capable of finely adjusting a direction of the antenna to a direction of the satellite during movement of the moving body in consideration with a declination defined by an area where the moving body is located.

According to the present invention, there is provided a control system for controlling an antenna mounted on a moving body such as a vehicle and rotatable to directly receive a transmitting signal from a geostationary satellite in space so as to apply it to a receiving equipment on the moving body, the control system which comprises:

first means for producing a first signal indicative of a difference between a standard direction and a movement direction of the moving body;

second means for producing a second signal indicative of a difference between the movement direction of the moving body and a direction of the antenna;

third means for determining a difference between the movement direction of the moving body and a predetermined direction of the satellite defined by its position in accordance with a value of the first signal on a basis of a predetermined difference between the standard direction and the direction of the satellite, the third means producing a third signal indicative of the determined difference;

fourth means for determining an adjustment angle for rotation of the antenna in accordance with values of the second and third signals and for producing an output signal indicative of the determined adjustment angle; and drive means responsive to the output signal for effecting rotation of the antenna to adjust the direction of the antenna to the direction of the satellite.

BRIEF DESCRIPTION OF THE DRAWINGS

Additional objects and advantages of the present invention will be more readily apparent from the following detailed description of preferred embodiments thereof when taken together with the accompanying drawings in which.

DESCRIPTION OF THE PREFERRED EMBODIMENTS

Figure 1:
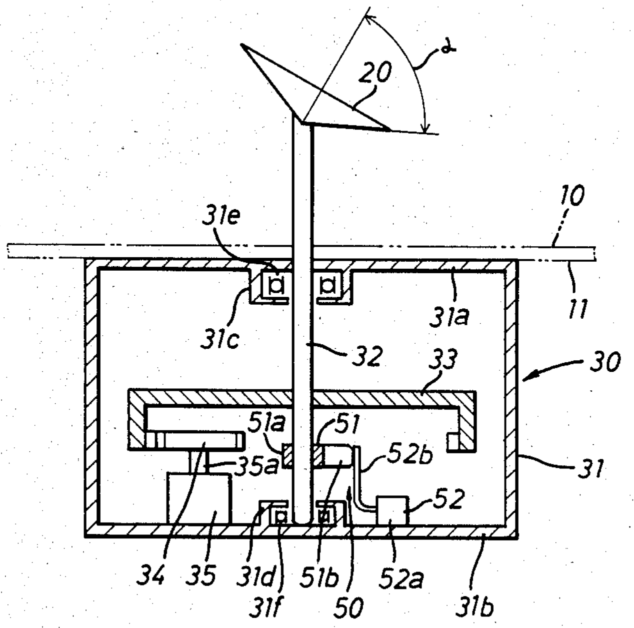
FIG. 1 is a vertically cross-sectional view of a rotary mechanism assembled on a vehicle roof to rotatably support a parabolic antenna.
Figure 2:
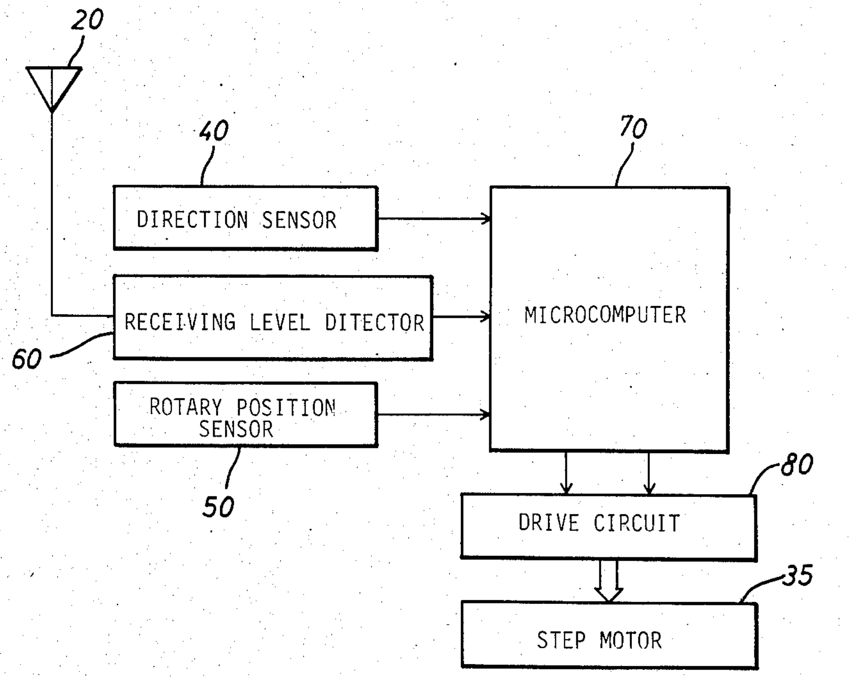
FIG. 2 is a block diagram for driving the step motor of FIG. 1.

Referring now to FIGS. 1 and 2 of the drawings, there is illustrated a control apparatus in accordance with the present invention which is adapted to a parabolic antenna 20 of a radio receiver installed within a compartment of an automotive vehicle. The control apparatus comprises a rotary mechanism 30 which is assembled in the compartment to support the antenna 20 over a roof 10 of the vehicle rotatably in a plane parallel with an outer surface of roof 10. This means that the antenna 20 is rotatable in a horizontal plane when the vehicle is on a flat road. The rotary mechanism 30 includes a housing 31 which is secured at its upper wall 31*a* to a central portion of an inner surface 11 of the vehicle roof 10. The rotary mechanism 30 also includes a rotary rod 32 which is assembled in the housing 31 perpendicularly to the roof 10. The rod 32 is rotatably supported by a pair of bearings 31*c*, 31*f* carried respectively on inner bosses 31*e*, 31*d* which are formed integral with inner surface center portions of upper and lower walles 31*a*, 31*b* of housing 31 respectively. In addition, the rod 32 is engaged at its lower end rotatably on the inner surface center portion of lower wall 31*b* and prevented from axial movement thereof.

The rotary rod 32 extends upward through the upper wall 31*a* of housing 31 and the roof 10 to integrally support at its top end the parabolic antenna 20 with a predetermined slant angle $\alpha$ (see FIG. 1). The predetermined slant angle $\alpha$ is defined by a horizontal line and a direction by a position of a synchronous or geostationary satellite located above the earth's equator in space. An internal gear 33 is coaxially supported on an intermediate portion of rod 32 in the housing 31 for its rotation integral with the rod 32 and meshes with a spur gear 34. The spur gear 34 is fixedly supported at its central portion on an output shaft 35*a* extending upward from a step motor 35 which is secured on the lower wall 31*b* within the housing 31. With the rotary mechanism 30, the step motor 35 is driven in one direction to rotate the gears 34, 33 in the same direction such that the antenna 20 is rotated by the rod 32 in the same direction as those of the gears 34, 33. The step motor 35 is also driven in the other direction to rotate the gears 34, 33 in the same direction such that the antenna 20 is rotated by the rod 32 in the same direction as those of the gears 34, 33. In the embodiment, driving of step motor 35 in one (or the other) direction corresponds to steering of a steering wheel of the vehicle in a rightward (or leftward) direction.

As shown in FIG. 2, the control apparatus also comprises a microcomputer 70 which is connected to a direction sensor 40, a rotary position sensor 50 and a receiving level detector 60. The direction sensor 40 is provided on a body portion of the vehicle to detect an azimuthal angle $\theta_v$ between the north direction and a travel direction of the vehicle so as to produce an azimuth signal indicative of the detected azimuthal angle $\theta_v$. The rotary position sensor 50 is, as shown in FIG. 1, assembled in the housing 31 of rotary mechanizm 30 and provided with a movable member 51 and a fixed member 52 for its selective contact with the movable member 51. The movable member 51 has an annular portion 51*a* of insulation material which is coaxially fixed on a lower portion of rod 32. The movable member 51 also has a protrusion 51*b* of conductive material which extends from an outerperiphery portion of annular portion 51 outward in a radial direction within a vertical plane including a direction of the maximum receiving sensitivity of parabolic antenna 20.

The fixed member 52 has a base portion 52*a* of insulation material which is secured on the lower wall 31*b* of housing 31 adjacent to the movable member 51. The fixed member 52 also has an L-shaped resilient plate 52*b* of conductive material which extends from the base portion 52*a* upwardly to be contacted at its tip end with a tip surface of protrusion 51*b* within a vertical plane including the axis of rod 32 in parallel with a straight travel direction of the vehicle. When the movable member 51 is rotated in accordance with rotation of rod 32 to contact the tip surface of protrusion 51*b* with the tip end of resilient plate 52*b*, the rotary position sensor 50 produces a rotary position signal indicative of the contact of protrusion 51*b* with the resilient plate 52*b*. This means that the rotary position signal from sensor 50 indicates that the direction of the maximum receiving sensitivity of antenna 20 accords with the above-noted vertical plane including the axis of rod 32.

The receiving level detector 60 is a portion of a receiving circuit of the radio receiver to receive a transmitter or radio signal indicative of a desired broadcast program from the geostationary satellite through the antenna 20. Then, the receiving level detector 60 selects intermediate frequency components from the transmitter signal on a basis of a tuned frequency of the radio receiver and detects low frequency components from the selected intermediate frequency components to generate a receiving level signal indicative of a level of the detected low frequency components. The microcomputer 70 previously stores therein a predetermined computer program which is defined by flow diagrams shown in FIGS. 3 through 6. In operation, the microcomputer 70 cooperates with the direction sensor 40, the rotary position sensor 50 and the receiving level detector 60 to repetitively execute the computer program in accordance with the flow diagrams of FIGS. 3 to 6 such that a drive circuit 80 is controlled to drive the step motor 35, as described later. In addition, the radio receiver acts to broadcast the desired radio program in relation to the receiving level signal from receiving level detector 60.

OPERATION

Figure 3:
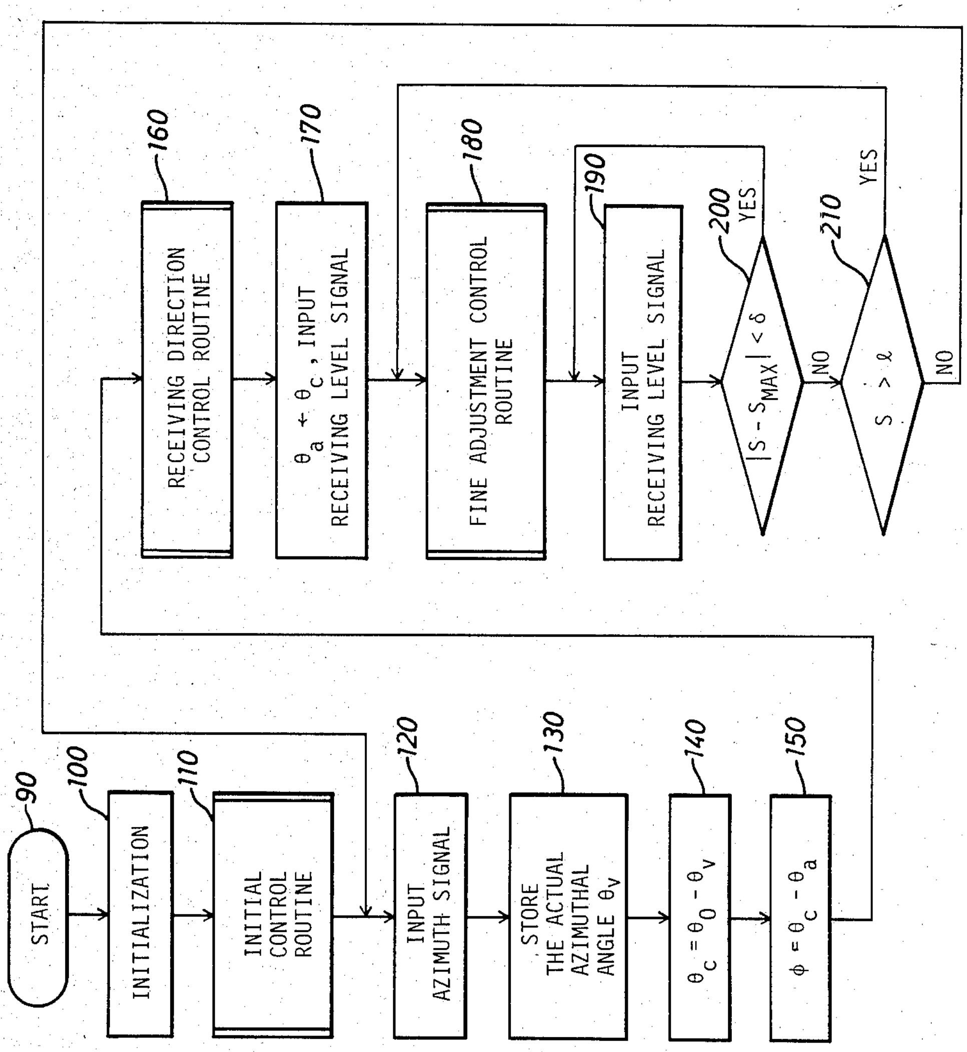
FIG. 3 is a whole flow diagram defining a computer program executed by the microcomputer of FIG. 1.
Figure 4:
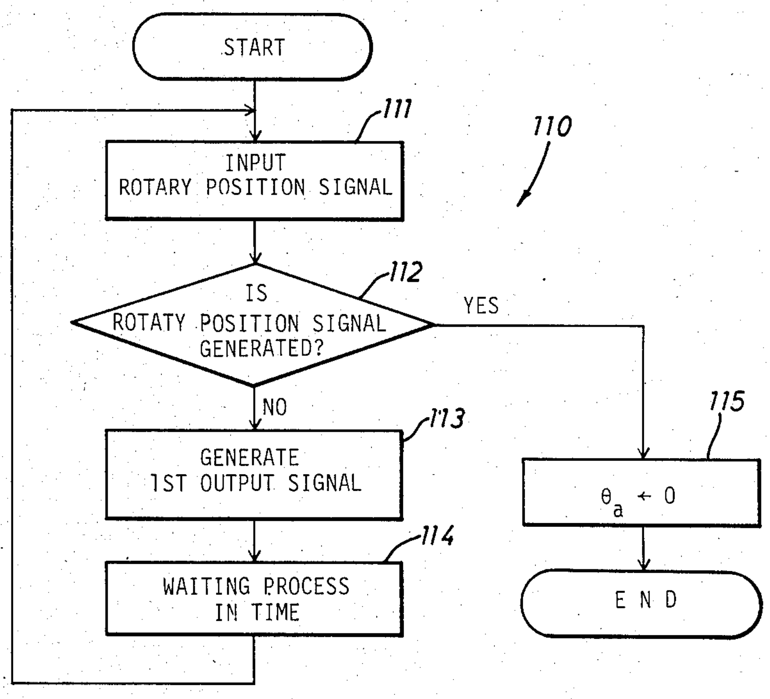
FIG. 4 is a detail flow diagram illustrating the initial control routine of FIG. 2.

When the control apparatus is ready for operation during straight travelling of the vehicle along a flat road, the microcomputer 70 initiates execution of the computer program at a step 90 in accordance with the flow diagram of FIG. 3 to perform initialization thereof at the following step 100. When the computer program proceeds to an initial control routine 110, as shown in FIGS. 3 and 4, the microcomputer 70 determines a "NO" answer at a step 112 if the rotary position sensor 50 does not produce any rotary position signal at this stage. Then, the microcomputer 70 generates at a step 113 a first output signal indicative of a predetermined rotational angle of step motor 35 in one direction and thereafter performs a waiting process in time at a step 114. Upon start of the performance at step 114, a timer of microcomputer 70 initiates measurement of time lapse after generation of the first output signal from microcomputer 70. In the embodiment, the predetermined rotational angle corresponds to a predetermined rotary angle $\Delta\theta$ of antenna 20 which is previously stored in the microcomputer 70.

When the first output signal appears from the microcomputer 70, as previously described, the drive circuit 80 generates a first pulse signal indicative of the predetermined rotational angle of step motor 35 in one direction and applies the same pulse signal to the step motor 35. Then, the step motor 35 rotates in response to the first pulse signal from drive circuit 80 in one direction to rotate the gears 34, 33 and rod 32 in the same direction. Thus, the parabolic antenna 20 is horizontally rotated by the rod 32 in one direction with the predetermined rotary angle $\Delta\theta$. When the measured time of the timer of microcomputer 70 reaches a predetermined value required for rotating the step motor 35 by the predetermined rotational angle, the microcomputer 70 ends the performance thereof at step 114 to return the control routine 110 to a step 111.

Figure 7:
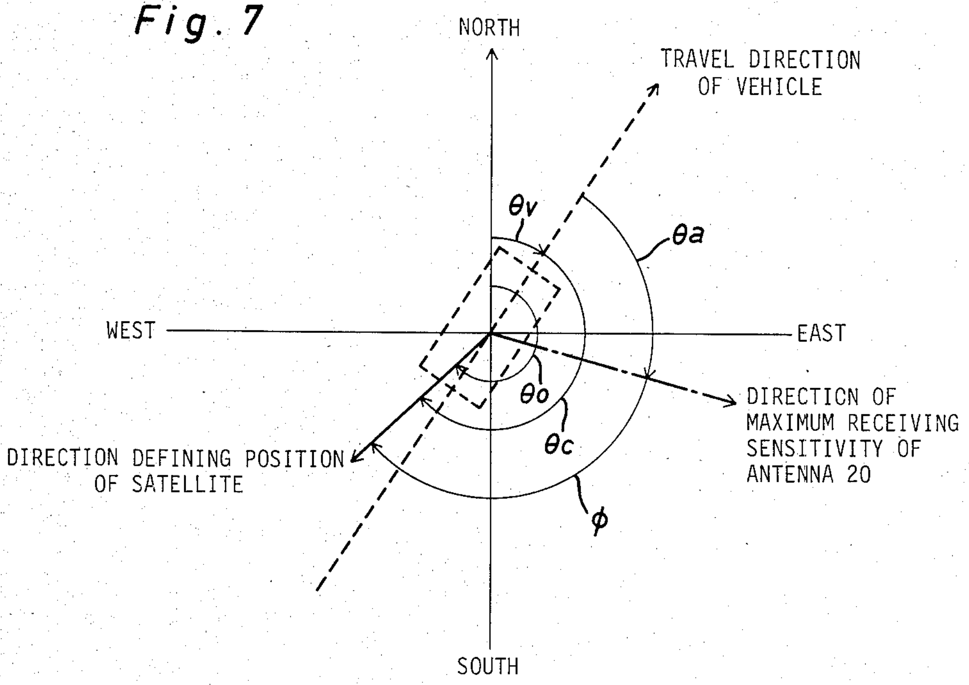
FIG. 7 is an explanatory chart for calculating a desired rotary angle of the antenna in relation to a travel direction of the vehicle and a direction defining the position of a geostationary satellite.

During repetitive rotations of antenna 20 in one direction with the predetermined rotary angle $\Delta\theta$ under control of the microcomputer 70 repetitively executing the initial control routine 110 through the steps 111 to 114, the rotary position sensor 50 generates a rotary position signal when the direction of the maximum receiving sensitivity of antenna 20 accords with the straight travelling direction of the vehicle. Then, the microcomputer 70 receives at a step 111 the rotary position signal from sensor 50 and determines a "YES" answer at the following step 112 to set the actual rotary angle $\theta_a$ of antenna 20 equal to zero. The actual rotary angle $\theta_a$ is defined by an angular difference between the direction of the maximum receiving sensitivity of antenna 20 and the straight travelling direction of the vehicle (see FIG. 7).

After completing execution of the initial control routine, as described above, the microcomputer 70 receives an azimuth signal from direction sensor 40 at a step 120 (see FIG. 3). Then, an A-D converter of microcomputer 70 converts a value of the received azimuth signal into a digital value which is temporarily stored as the actual absolute azimuthal angle $\theta_v$ (see FIG. 7) of the vehicle by the microcomputer 70 at a step 130. When the computer program proceeds to a step 140, the microcomputer 70 subtracts the actual absolute azimuthal angle $\theta_v$ from a predetermined azimuthal angle $\theta_o$ to set the subtracted resultant value equal to the actual relative azimuth angle $\theta_c$ (see FIG. 7) which indicates an angular difference between the direction defined by the position of the geostationary satellite and the straight travelling direction of the vehicle. Thereafter, the microcomputer 70 subtracts the actual rotary angle $\theta_a$ (=0) of antenna 20 from the actual relative azimuth angle $\theta_c$ at a step 150 to set the subtracted resultant value equal to a desired rotary angle $\phi$ (see FIG. 7) with which the direction of the maximum receiving sensitivity of antenna 20 is accorded to the direction defined by the position of the satellite. In the embodiment, the predetermined azimuthal angle $\theta_o$ is defined by an angular difference between the north direction and the direction defined by the position of the geostationary satellite and previously stored in the microcomputer 70.

Figure 5:
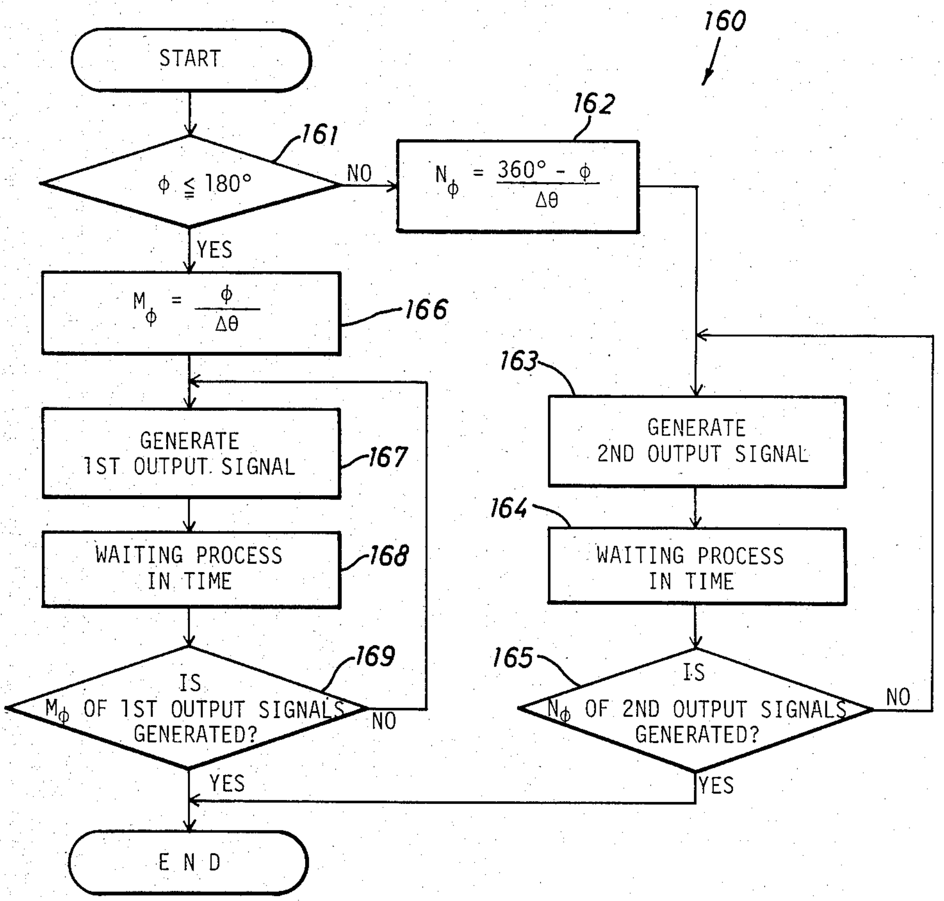
FIG. 5 is a detail flow diagram illustrating the receiving direction control routine of FIG. 2.

When the computer program proceeds to a receiving direction control routine 160, as shown in FIGS. 3 and 5, the microcomputer 70 determines a "NO" answer at a step 161 if the desired rotary angle $\phi$ is larger than 180° in relation to the actual rotary angle $\theta_a=0$. Then, the microcomputer 70 calculates an angular difference between 360° and the desired rotary angle $\phi$ at a step 162 and, in turn, divides the calculated angular difference (360°$-\phi$) by the predetermined rotary angle $\Delta\theta$ to set the divided resultant value $\{(360°-\phi)/\Delta\theta\}$ equal to the number N $\phi$ of second output signals indicative of the predetermined rotational angle of step motor 35 in the other direction. Thereafter, the microcomputer 70 generates a second output signal at a step 163 and starts at the following step 164 the same execution as that at the step 114 (see FIG. 4).

Upon receiving the second output signal from microcomputer 70, the drive circuit 80 generates a second pulse signal indicative of the predetermined rotational angle of step motor 35 in the other direction and applies the same pulse signal to the step motor 35. Then, the step motor 35 rotates in response to the second pulse signal from drive circuit 80 in the other direction to rotate the gears 34, 33 and rod 32 in the same direction. Thus, the antenna 20 is horizontally rotated by the rod 32 in the other direction with the predetermined rotary angle $\Delta\theta$. When the execution at step 164 ends in the same manner as that at step 114, the microcomputer 70 determines at a step 165 a "NO" answer because the number of second output signals issued at step 163 is less than the number N $\phi$ obtained at step 162. Thereafter, the microcomputer 70 executes the control routine 160 through the steps 163 to 165 repetitively to rotate the antenna 20 in the other direction with the predetermined rotary angle $\Delta\theta$ and then determines a "YES" answer at step 165 when the number of the second output signals issued at step 163 is equal to the number N$\phi$ obtained at step 162. This means that the antenna 20 has rotated by $\Delta\theta$N$\phi$ in the other direction to roughly adjust its direction to the direction of the satellite.

If the decision at the above-noted step 161 of control routine 160 is "YES", the microcomputer 70 divides the desired rotary angle $\phi$ by the predetermined rotary angle $\Delta\theta$ at a step 166 to set the divided resultant value ($\phi/\Delta\theta$) equal to the number M$\phi$ of first output signals. Then, the microcomputer 70 generates a first output signal at a step 167 and starts at the following step 168 the same execution as that at the step 114. Upon receipt of the first output signal from microcomputer 70, the drive circuit 80 generates a first pulse signal in response to which the step motor 35 rotates in one direction to rotate the rod 32, as previously described. Thus, the antenna 20 is rotated by the rod 32 in one direction with the predetermined rotary angle $\Delta\theta$. When the execution at step 168 ends in the same manner as that at step 114, the microcomputer 70 determines at a step 169 a "NO" answer because the number of first output signals issued at step 167 is less than the number M$\phi$ obtained at step 166. Thereafter, the microcomputer 70 executes the control routine 160 through the steps 167 to 169 repetitively to rotate the antenna 20 in one direction with the predetermined rotary angle $\Delta\theta$ and then determines a "YES" answer at step 169 when the number of the first output signals issued at step 167 is equal to the number M$\phi$ obtained at step 166. This means that the antenna 20 has rotated by $\Delta\theta$M$\phi$ in one direction to roughly adjust its direction to the direction of the satellite.

Figure 6:
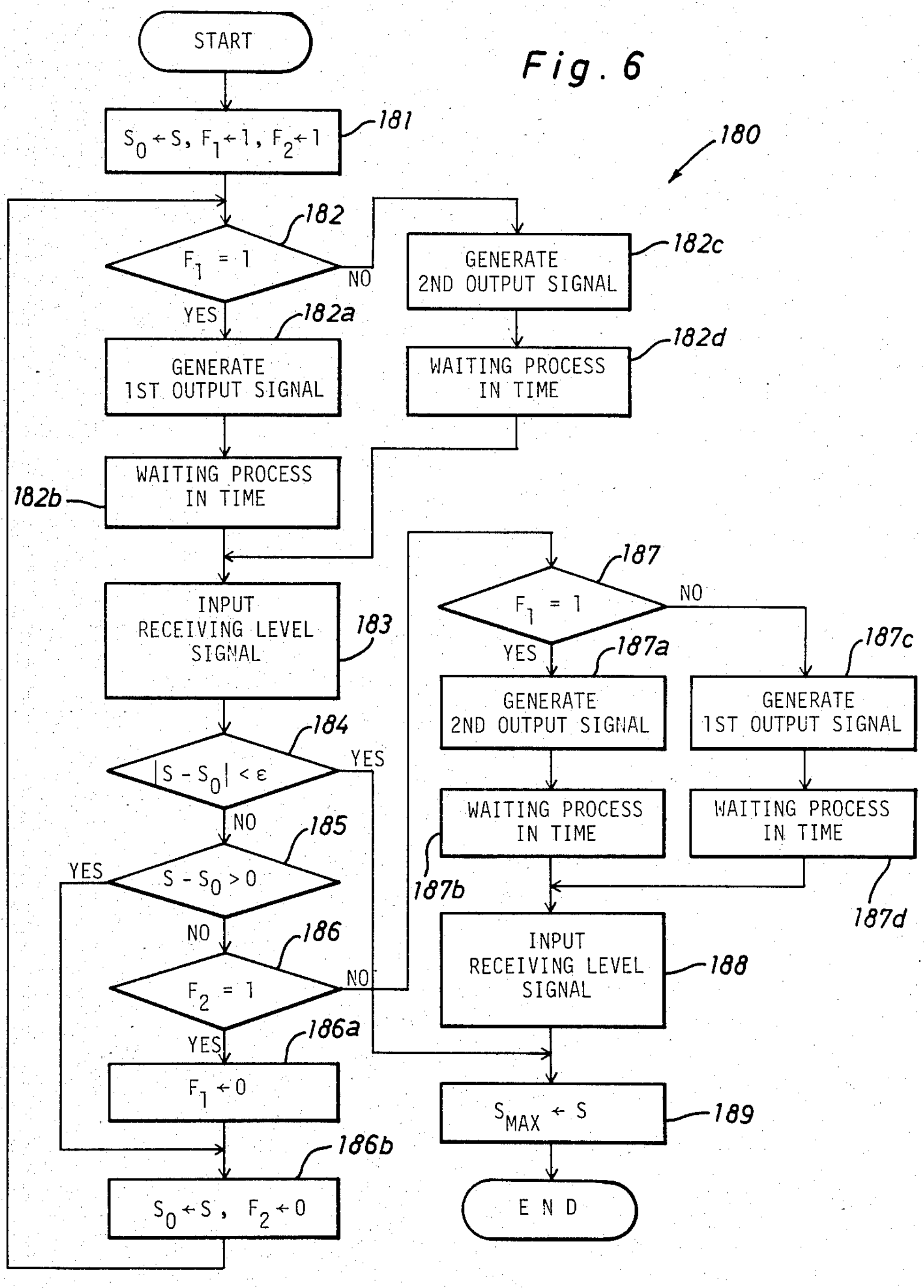
FIG. 6 is a detail flow diagram illustrating the fine adjustment control routine of FIG. 2.

At a step 170 of FIG. 3 after completing the execution of control routine 160, as previously described, the microcomputer 70 sets the actual relative azimuth angle $\theta_c$ obtained at step 140 equal to the actual rotary angle $\theta_a$ and receives a receiving level signal from detector 60. Then, the A-D converter of microcomputer 70 converts a level of the receiving level signal from detector 60 into a digital value S which is temporarily stored in the microcomputer 70. When the computer program proceeds to a fine adjustment control routine 180, as shown in FIGS. 3 and 6, the microcomputer 70 sets at a step 181 the digital value S equal to a preceding digital value $S_0$ and also sets each of flags $F_1$, $F_2$ equal to "1". In the embodiment, the flag $F_1=1$ (or $F_1=0$) indicates rotation of antenna 20 in one (or the other) direction, and the flag $F_2=1$ (or $F_2=0$) indicates once (or twice or more) fine adjustment of rotation of antenna 20.

When the control routine 180 proceeds to a step 182, the microcomputer 70 determines a "YES" answer based on the flag $F_1=1$, and generates a first output signal at the following step 182*a* to rotate the antenna 20 in one direction with the predetermined rotary angle $\Delta\theta$, as previously described. Upon completing at a step 182*b* the same execution as that at step 168, the microcomputer 70 receives at a step 183 a receiving level signal from detector 60, and the A-D converter of microcomputer 70 converts a level of the same receiving level signal into a digital value S which is temporarily stored in the microcomputer 70. If at this stage an absolute value $|S-S_0|$ of a difference between the preceding digital value $S_0$ set at step 181 and the digital value S stored at step 183 is smaller than a standard minute value $\epsilon$, the microcomputer 70 determines a "YES" answer at a step 184 to set at a step 189 the digital value S obtained at step 183 as the maximum value $S_{max}$ of the receiving sensitivity of antenna 20. This means that the direction of the maximum receiving sensitivity of antenna 20 accords precisely to the direction defined by the position of the satellite. In the embodiment, the standard minute value $\epsilon$ is previously stored in the microcomputer 70 for deciding whether fine adjustment of rotation of antenna 20 is further required or not.

If the decision at the above-noted step 184 is "NO", the microcomputer 70 determines a "YES" answer at a step 185 in case the digital value S stored at step 183 is larger than the preceding digital value $S_0$ set at step 181. Then, at the following step 186*b* the microcomputer 70 updates the digital value S stored at step 183 into a preceding digital value $S_0$, and also resets the flag $F_2$ equal to zero. In other words, on a basis of the "YES" answer at step 185 the microcomputer 70 decides that the above-mentioned fine adjustment of rotation of antenna 20 in one direction is correct, and then returns the control routine 180 to the step 182 for further fine adjustment of rotation of the antenna 20 in the same direction. Thereafter, the microcomputer 70 performs the execution from step 182 to step 182*b*, as previously described, to further rotate the antenna 20 in one direction with the predetermined rotary angle $\Delta\theta$, and the A-D converter of microcomputer 70 converts a level of a receiving level signal, which is received by the microcomputer 70 from detector 60 at step 183, into a digital value S. If at this stage an absolute value $|S-S_0|$ of a difference between the digital value S obtained at step 183 and the preceding digital value $S_0$ updated at step 186*b* is smaller than the standard minute value $\epsilon$, the microcomputer 70 determines a "YES" answer at step 184 so that the latest digital value S stored at step 183 is set equal to the maximum value $S_{max}$ of the receiving sensitivity at step 189.

When the decision at each of steps 184, 185 is "NO" after the control routine 180 proceeds to the step 183 with the flag $F_1=1$ and the flag $F_2=0$, the microcomputer 70 determines a "NO" answer at a step 186 based on the flag $F_2=0$ to determine at the following step 187 as to whether or not the flag $F_1=1$. In other words, the microcomputer 70 determines excessive adjustment of rotation of antenna 20 in one direction to advance the control routine 180 to step 187, because the "NO" answer at step 185 with $F_1=1$ and $F_2=0$ follows the "YES" answer at step 185 with $F_1=F_2=1$. Then, the microcomputer 70 determines at step 187 a "YES" answer based on the flag $F_1=1$, and generates a second output signal at a step 187*a* to rotate the antenna 20 in the other direction with the predetermined rotary angle $\Delta\theta$, as previously described. Upon completing at a step 187*b* the same execution as that at step 164, the microcomputer 70 receives at a step 188 a receiving level signal from detector 60, and the A-D converter of microcomputer 70 converts a level of the same signal into a digital value S which is set equal to the maximum value $S_{max}$ of the receiving sensitivity by the microcomputer 70 at step 189.

If the decision at each of the above-noted steps 184, 185 is "NO" after the execution passing from the step 181 to step 183 through the step 182*a*, the microcomputer 70 determines at step 186 a "YES" answer based on the flag $F_2=1$, and in turn, resets the flag $F_1=0$ at the following step 186*a* so that the digital value S is set equal to the preceding digital value S with reset of the flag $F_2=0$. In other words, on a basis of the "NO" answer at step 185 the microcomputer 70 decides that the fine adjustment of rotation of antenna 20 in one direction caused by the execution at step 182*a* is incorrect, and then returns the control routine 180 to the step 182 for fine adjustment of rotation of antenna 20 in the other direction. Thereafter, the microcomputer 70 determines at step 182 a "NO" answer based on the flag $F_1=0$ reset at step 186*a*, and generates a second output signal to rotate the antenna 20 in the other direction with the predetermined rotary angle $\Delta\theta$, as previously described.

Upon completing at a step 182*d* the same execution as that at step 164 of FIG. 5, the microcomputer 70 cooperates with the A-D converter at step 183 to convert a level of a receiving level signal from detector 60 into a digital value S and also temporarily stores therein the digital value S. When the decision at step 185 is "YES" after a "NO" answer at step 184, as previously described, the microcomputer 70 performs the execution through the steps 182 to 182*d* to further rotate the antenna 20 in the other direction with the predetermined rotary angle $\Delta\theta$. Then, a level of a receiving level signal appearing from detector 60 after the above-mentioned rotation of antenna 20 in the other direction is converted by the A-D converter of microcomputer 70 into a digital value S which is temporarily stored in the microcomputer 70 at step 183. If the decision at step 184 is "YES" based on the digital value S stored at step 183 and the preceding digital value $S_0$ updated at step 186*b*, the microcomputer 70 advances the control routine 180 to the step 189 so that the latest digital value S stored at step 183 is set equal to the maximum value $S_{max}$ of the receiving sensitivity.

If the decision at the above-noted step 184 is conversely "NO", the microcomputer 70 performs the execution at step 185, as previously described. If the decision at step 185 is "NO", the microcomputer 70 determines a "YES" answer at step 186 based on the flag $F_2=0$. In other words, the microcomputer 70 determines excessive adjustment of rotation of antenna 20 in the other direction to advance the control routine 180 to the step 187, because the "NO" answer at step 185 follows the "YES" answer at step 185 with $F_1=F_2=0$. Then, the microcomputer 70 determines a "NO" answer at step 187 based on the flag $F_1=0$ reset at step 186*a*, and generates a first output signal at step 187*c* to rotate the antenna 20 in one direction with the predetermined rotary angle $\Delta\theta$, as previously described. Upon completing at a step 187*d* the same execution as that at step 182*b*, the microcomputer 70 cooperates with the A-D converter at step 188 to convert a level of a receiving level signal from detector 60 into a digital value S which is set equal to the maximum value $S_{max}$ of the receiving sensitivity at step 189.

Upon completing the execution of the fine adjustment control routine 180, as described above, the microcomputer 70 cooperates with the A-D converter at a step 190 of FIG. 3 to convert a level of a receiving level signal from detector 60 into a digital value S which is temporarily stored in the microcomputer 70. If at this stage an absolute value $|S-S_{max}|$ of a difference between the digital value S stored at step 190 and the maximum value $S_{max}$ of the receiving sensitivity set at step 189 is smaller than a predetermined minute value $\delta$, the microcomputer 70 determines a "YES" answer at a step 200 to return the computer program to the step 190. This means that during repetitive execution of the computer program through the steps 190, 200, the direction of the maximum receiving sensitivity of antenna 20 accords precisely with the direction defined by the position of the satellite. As a result, the radio program transmitted from the satellite can be always broadcasted by the radio receiver with a good receiving sensitivity. In the embodiment, the predetermined minute value $\delta$ is previously stored in the microcomputer 70 for determining whether or not the direction of the maximum receiving sensitivity of antenna 20 accords precisely with the direction defined by the position of the satellite.

If the decision at the above-noted step 200 is conversely "NO", the microcomputer 70 advances the computer program to the following step 210. In case at this stage the digital value S stored at step 190 is larger than a predetermined value l, the microcomputer 70 determines a "YES" answer at the step 210 to return the computer program to the fine adjustment control routine 180. This means that when $|S-S_{max}|\geqq\delta$ and $S>l$, the direction of the maximum receiving sensitivity of antenna 20 can be precisely accorded without any dependence on the direction sensor 40 to the direction defined by the position of the satellite under execution of microcomputer 70 through the fine adjustment control routine 180. If the decision at the above-noted step 210 is conversely "NO", the microcomputer 70 determines a large error between the direction of the maximum receiving sensitivity of antenna 20 and the direction defined by the position of the satellite and returns the computer program to the step 120 to ensure the rough adjustment of antenna 20 as described above. In the embodiment, the predetermined value l corresponds to a predetermined level of a receiving level signal issued from the detector 60 and is previously stored in the microcomputer 70. In addition, the predetermined level of the receiving level signal defines good receiving sensitivity of the radio receiver.

Figure 8:
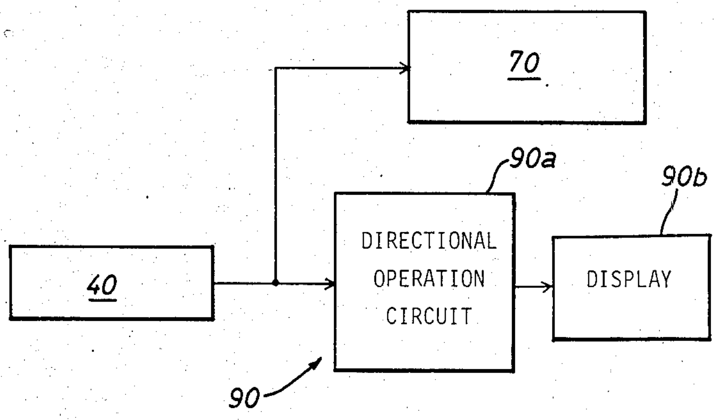
FIG. 8 depicts a partial modification of the block diagram of FIG. 2.
Figure 9:
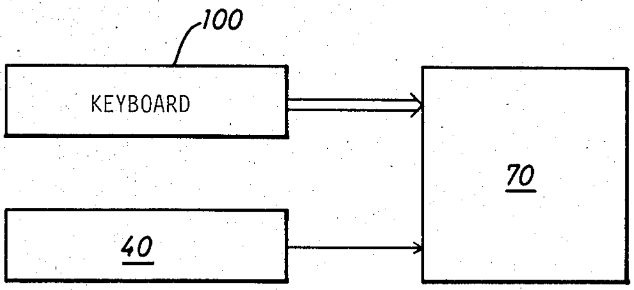
FIG. 9 depicts another partial modification of the block diagram of FIG. 2.

For practice of the present invention, a direction display unit 90 for the vehicle may be connected to the direction sensor 40 in addition to the microcomputer 70, as shown in FIG. 8. The direction display unit 90 is provided with an directional operation circuit **90*a* which is responsive to the azimuth signal from direction sensor 40 to calculate the travelling direction of the vehicle so as to generate a display signal indicative of the calculated travelling direction. The direction display unit 90 is also provided with a display 90*b* which is installed in the vehicle compartment to display the calculated travelling direction of the vehicle in response to the display signal from operation circuit 90*a*. This means to eliminate an additional direction sensor for the display unit 90** only.

Figure 10:
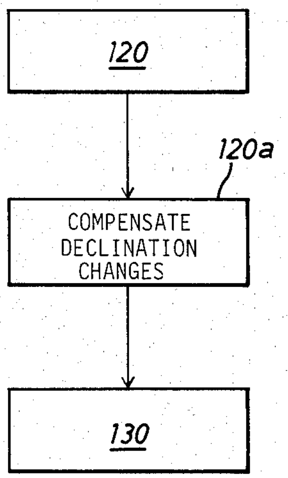
FIG. 10 illustrates a partial modification of the whole diagram of FIG. 3.
Figure 11:
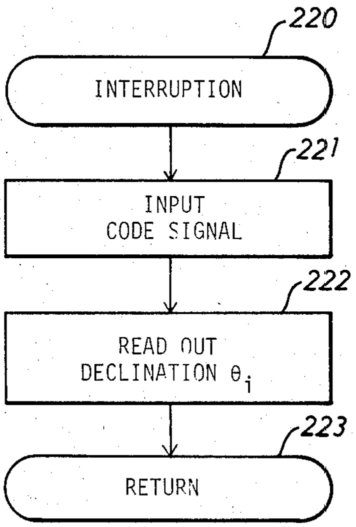
FIG. 11 is a flow diagram defining an interruption control program executed by the microcomputer.
Figure 12:
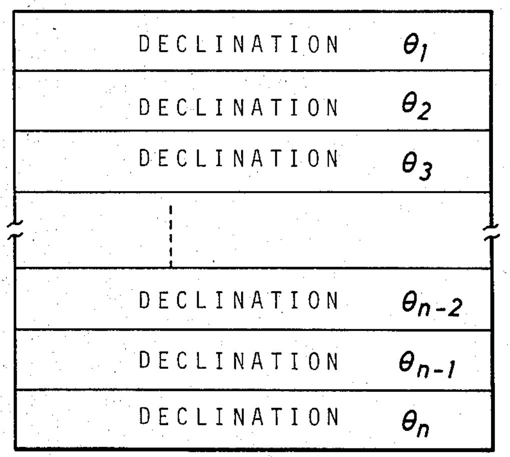
FIG. 12 is a chart indicative of declination data stored in the microcomputer previously.

FIGS. 9 to 12 illustrate another modification of the above embodiment wherein a keyboard 100 is additionally connected to the microcomputer 70. The keyboard 100 is manipulated to selectively produce first to nth code signals respectively indicative of declinations $\theta_1$ to $\theta_n$ different from each other. These declinations $\theta_1$, $\theta_2$, —, $\theta_n$ correspond respectively to first, second, —, nth travel areas different from each other in U.S.A. and previously stored in the microcomputer 70 as declination data (see FIG. 12). Furthermore, the computer program (see FIG. 3) described in the above embodiment is partly modified as shown in FIG. 10, and an interruption control program shown by a flow diagram in FIG. 11 is stored in the microcomputer 70 previously in addition.

In case the actual travel area of the vehicle changes, for instance, from the first travel area to the second travel area, the actual declination $\theta_1$ changes into the declination $\theta_2$ defined by the second travel area. When at this stage the keyboard 100 is manipulated to produce a second code signal indicative of the declination $\theta_2$, the second code signal is applied to the microcomputer 70. Then, the microcomputer 70 is responsive to the second code signal from keyboard 100 to start execution of the interruption control program at a step 220 of the flow diagram shown in FIG. 11 and temporarily stores therein the second code signal at the following step 221. Subsequently, the microcomputer 70 reads out at a step 222 the declination $\theta_2$ from the declination data of FIG. 12 in relation to the stored second code signal to end the interruption control program at a return step 223.

When the microcomputer 70 enters execution of the step 120 of the computer program in response to completion of the interruption control program, it receives an azimuth signal from direction sensor 40, as previously described. Then, the microcomputer 70 compensates at a step **120*a* (see FIG. 10) a value of the azimuth signal based on the declination $\theta_2$ read out at step 222 and temporarily stores the compensated value as the actual absolute azimuth angle $\theta_v$ at step 130. This means that the actual relative azimuth angle $\theta_c$ and a desired rotary angle $\phi$ are precisely obtained at steps 140, 150 of the computer program. In other words, rotary control of antenna 20 is precisely attained in dependence on change of declination under control of microcomputer 70 advancing the computer program from the control routine 160 to the step 210**.

Although in the above embodiment the rotary position sensor 50 is provided to detect a rotary position of antenna 20, for instance a variable resistor or a potentiometer may be also replaced with the position sensor 50 to continuously detect a difference between the direction of the maximum receiving sensitivity of antenna 20 and the travelling direction of the vehicle so as to eliminate the initial control routine 110.

While in the above embodiment the present invention is adapted to the antenna 20 of the radio receiver installed in the vehicle compartment, it may be also adapted to various kinds of antennas of a television receiver installed in the vehicle compartment and a radio or television receiver provided with a moving body such as a ship or the like.

In the above embodiment, the rotary mechanism 30 having the step motor 35 is provided to rotate the antenna 20. However, a rotary mechanism having for instance a hydraulic or pneumatic motor may be replaced with the rotary mechanism 30. In this case, the hydraulic or pneumatic motor is driven by a proper means under control of the microcomputer 70 to rotate the antenna 20.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A control system for controlling an antenna mounted on a moving body such as a vehicle and rotatable to directly receive a transmitting signal from a geostationary satellite in space so as to apply it to a receiving equipment on said moving body, the control system comprising:

antenna direction means for monitoring a direction of said antenna;

detection means for detecting a level of transmitting signal received by said antenna;

body direction means for producing a first signal indicative of a difference between a standard direction and a movement direction of said body;

processing means, responsive to said body direction means, antenna direction means and detection means, for (1) producing a second signal indicative of a difference between the movement direction of said moving body and said direction of said antenna monitored by said antenna direction means, (2) determining a difference between the movement direction of said moving body and a predetermined direction of said satellite defined by its position in accordance with a value of the first signal on a basis of a predetermined difference between the standard direction and the direction of said satellite, said third means producing a third signal indicative of the determined difference (3) determining whether or not the level of the received transmitting signal from said detection means is lower than a predetermined level and if so, producing a first command signal and if not, producing a second command signal, (4) in response to said first command signal, determining an adjustment angle for rotation of the antenna in accordance with values of the second and third signals and for producing a rough control signal indicative of the determined adjustment angle, (5) in response to the second command signal, determining whether or not a rate of change of the received transmitting signal is within a predetermined range and if not, producing a fine control signal; and drive means responsive to the rough control signal for effecting rotation of said antenna to coarsely adjust the direction of said antenna to the direction of said satellite, said drive means being further responsive to the fine control signal to effect fine adjustment of the direction of said antenna to the direction of said satellite.

2. A control system as claimed in claim 1, wherein:

said processing means also determines whether or not the adjustment angle for rotation of said antenna is smaller than or equal to 180°, if so producing a second rough control signal, and if not, producing a third rough control signal; and said drive means is responsive to said second rough control signal to rotate said antenna in one direction defined by the adjustment angle and responsive to said third rough control signal to rotate said antenna in a reverse direction.

3. A control system as claimed in claim 1 wherein: said system further comprises user operable selector means for generating a declination signal indicative of a declination defined by an area where said moving body is located; and said processing means also compensates a value of the first signal in accordance with a value of the declination signal and generates a compensation signal indicative of the compensated value of the first signal, said function (2) of said processing means determining a difference between the movement direction of said moving body and the predetermined direction of said satellite in accordance with the value of the compensation signal on a basis of the predetermined difference.

4. A control system as claimed in claim 1, wherein:

said processing means generates an initial control signal when a value of the second signal is not zero, and ceases the generation of the initial control signal after the value of the second signal becomes zero; and said drive means is responsive to the initial control signal to accord the direction of said antenna to the movement direction of said moving body.

5. A control system as claimed in claim 1, wherein said body direction means is a direction sensor which is adapted to produce the first signal and further includes a display unit to indicate the movement direction of said moving body.

6. A control system as claimed in claim 1, wherein said processing means also determines whether or not the level of the received transmitting signal is within a predetermined range and if not, produces a third command signal, said processing means performing function (3) in response to generation of the third command signal.

7. A control system as claimed in claim 6, wherein:

said processing means also determines whether or not the adjustment angle for rotation of said antenna is smaller than or equal to 180°, if so producing a second rough control signal, and if not, producing a third rough control signal; and said drive means is responsive to said second rough control signal to rotate said antenna in one direction defined by the adjustment angle and responsive to said third rough control signal to rotate said antenna in a reverse direction.

8. A control system as claimed in claim 6 wherein:

said system further comprises user operable selector means for generating a declination signal indicative of a declination defined by an area where said moving body is located; and said processing means also compensates a value of the first signal in accordance with a value of the declination signal and generates a compensation signal indicative of the compensated value of the first signal, said function (2) of said processing means determining a difference between the movement direction of said moving body and the predetermined direction of said satellite in accordance with the value of the compensation signal on a basis of the predetermined difference.

9. A control system as claimed in claim 6, wherein:

said processing means generates an initial control signal when a value of the second signal is not zero, and ceases the generation of the initial control signal after the value of the second signal becomes zero; and said drive means is responsive to the initial control signal to accord the direction of said antenna to the movement direction of said moving body.

10. A control system as claimed in claim 6, wherein said body direction means is a direction sensor which is adapted to produce the first signal and further includes a display unit to indicate the movement direction of said moving body.

* * * * *